(12) United States Patent
Shaw et al.

(10) Patent No.: US 10,091,113 B2
(45) Date of Patent: Oct. 2, 2018

(54) NETWORK FUNCTIONS VIRTUALIZATION LEVERAGING UNIFIED TRAFFIC MANAGEMENT AND REAL-WORLD EVENT PLANNING

(71) Applicant: AT&T Intellectual Property I, L.P., Atlanta, GA (US)

(72) Inventors: Venson Shaw, Kirkland, WA (US); Rajendra Prasad Kodaypak, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 249 days.

(21) Appl. No.: 14/934,222

(22) Filed: Nov. 6, 2015

(65) Prior Publication Data

US 2017/0134287 A1    May 11, 2017

(51) Int. Cl.
*G06F 15/173* (2006.01)
*H04L 12/803* (2013.01)
*H04L 29/08* (2006.01)

(52) U.S. Cl.
CPC .......... *H04L 47/125* (2013.01); *H04L 67/327* (2013.01)

(58) Field of Classification Search
USPC .......................... 709/226, 223, 224, 239, 242
See application file for complete search history.

(56) References Cited

U.S. PATENT DOCUMENTS

| | | | |
|---|---|---|---|
| 6,522,629 B1 | 2/2003 | Anderson, Sr. | |
| 8,634,415 B2 | 1/2014 | Srinivasan et al. | |
| 8,913,613 B2 | 12/2014 | Srinivasan et al. | |
| 9,013,993 B2 | 4/2015 | Logan et al. | |
| 9,141,416 B2 * | 9/2015 | Bugenhagen | ....... G06F 9/45558 |
| 9,654,410 B2 * | 5/2017 | Birke | ....... H04L 47/52 |
| 9,699,089 B2 * | 7/2017 | Yang | ....... H04L 47/14 |
| 2007/0168499 A1 | 7/2007 | Chu | |

(Continued)

FOREIGN PATENT DOCUMENTS

WO    WO 2015031866    3/2015

OTHER PUBLICATIONS

Basta et al., "SDN and NFV Dynamic Operation of LTE EPC Gateways for Time-varying Traffic Patterns," Mobile Networks and Management, Feb. 28, 2015, pp. 63-76, Springer International Publishing.

(Continued)

*Primary Examiner* — Lan-Dai T Truong
(74) *Attorney, Agent, or Firm* — Hartman & Citrin LLC

(57) ABSTRACT

The concepts and technologies disclosed herein are directed to network functions virtualization ("NFV") leveraging unified traffic management and real-world event planning. According to one aspect of the concepts and technologies disclosed herein, a virtual network traffic management system ("VNTMS") can receive, via a traffic congestion monitor, from a virtual network function ("VNF"), a traffic congestion indicator that includes a traffic congestion state indicative of network traffic congestion experienced by the VNF. The VNTMS can analyze the traffic congestion indicator to determine a traffic management action to be taken to alleviate at least a portion of the network traffic congestion experienced by the VNF, and instruct a traffic congestion action responder to provide the traffic management action to the VNF.

20 Claims, 11 Drawing Sheets

(56) References Cited

U.S. PATENT DOCUMENTS

| | | | |
|---|---|---|---|
| 2009/0044270 A1 | 2/2009 | Shelly et al. | |
| 2011/0158245 A1* | 6/2011 | Petersen | H04L 49/35 370/401 |
| 2013/0343191 A1* | 12/2013 | Kim | H04L 47/11 370/235 |
| 2015/0341921 A1* | 11/2015 | Chen | H04W 72/0413 370/330 |
| 2017/0311183 A1* | 10/2017 | Cotanis | H04W 24/02 |

OTHER PUBLICATIONS

Xia et al., "SDN and Optical Flow Steering for Network Function Virtualization," presented as part of the Open Networking Summit, 2014.

Basta et al., "Applying NFV and SDN to LTE Mobile Core Gateways; The Functions Placement Problem," Proceedings of the $4^{th}$ workshop on All things cellular: operations applications, & challenges, Aug. 22, 2014, pp. 33-38, ACM.

* cited by examiner

NETWORK FUNCTIONS VIRTUALIZATION LEVERAGING UNIFIED TRAFFIC MANAGEMENT AND REAL-WORLD EVENT PLANNING

BACKGROUND

Network functions virtualization ("NFV") is a new technology initiative that aims to move traditional and evolving mobility networking functions like access network elements, core network elements, transport network elements, and others from purpose-built hardware to commercial-off-the-shelf ("COTS") server-based platforms. This is achieved by virtualizing mobility networking functions by creating virtual networking functions ("VNFs") that operate on COTS hardware.

SUMMARY

Concepts and technologies disclosed herein are directed to NFV leveraging unified traffic management and real-world event planning. According to one aspect of the concepts and technologies disclosed herein, a virtual network traffic management system ("VNTMS") includes a traffic congestion monitor, a traffic congestion analyzer, and a traffic congestion action responder, all of which are executable by a NFV platform that includes a plurality of hardware resources such as compute, memory, and other resources. The traffic congestion monitor can receive, from a virtual network function ("VNF") that also is executable by the NFV platform, a traffic congestion indicator. The traffic congestion indicator can include a traffic congestion state indicative of network traffic congestion experienced by the VNF. The traffic congestion monitor also can provide the traffic congestion indicator to the traffic congestion analyzer. The traffic congestion analyzer can analyze the traffic congestion indicator to determine a traffic management action to be taken to alleviate at least a portion of the network traffic congestion experienced by the VNF. The traffic congestion analyzer also can analyze the traffic congestion indicator to determine a traffic management action to be taken to alleviate at least a portion of the network traffic congestion experienced by the VNF. The traffic congestion analyzer also can instruct the traffic congestion action responder to provide the traffic management action to the VNF. The network traffic congestion action responder can receive the instructions from the traffic congestion analyzer and can provide the VNF with the traffic management action to be taken to alleviate at least a portion of the network traffic congestion experienced by the VNF.

In some embodiments, the traffic congestion analyzer also can receive a policy from a policy system. In these embodiments, the traffic congestion analyzer can analyze, in accordance with the policy, the traffic congestion indicator to determine the traffic management action to be taken to alleviate the network traffic congestion experienced by the VNF.

In some embodiments, the traffic congestion analyzer also can receive an event from an external event system. The traffic congestion analyzer can analyze the event received from the external event system to determine the traffic management action to be taken to alleviate the network traffic congestion experienced by the VNF.

In some embodiments, the traffic management action includes increasing a traffic capacity of the VNF to support the network traffic congestion. In some embodiments, the traffic management action also includes reducing a traffic capacity of another VNF.

In some embodiments, the traffic management action includes relaxing a delivery time requirement for service delivery by the VNF. In some embodiments, the traffic management action also includes tightening a delivery time requirement for service delivery by another VNF.

In some embodiments, the traffic management action includes redirecting network traffic, which has a real-time performance requirement that is contributing to the network traffic congestion, from the VNF to another VNF. In these embodiments, the other VNF is less congested that the VNF.

In some embodiments, the traffic management action includes redirecting network traffic, which has a non-real-time performance requirement that is contributing to the network traffic congestion, from the VNF to another VNF. In these embodiments, the other VNF is more congested than the VNF.

In some embodiments, the traffic congestion monitor can receive, from another VNF that is executable by the NFV platform, another traffic congestion indicator. The other traffic congestion indicator can include another traffic congestion state indicative of another network traffic congestion experienced by the other VNF. The traffic congestion monitor also can generate an aggregated traffic congestion indicator based upon the traffic congestion indicator and the other traffic congestion indicator, and can provide the aggregated traffic congestion indicator to the traffic congestion analyzer. The traffic congestion analyzer can analyze the aggregate traffic congestion indicator to determine the traffic management action to be taken to alleviate the network traffic congestion experienced by the VNF and the other network traffic congestion experienced by the other VNF.

According to another aspect of the concepts and technologies disclosed herein, a computer-readable storage medium includes computer-executable instructions that, when executed by a compute resource of a NFV platform, causes a traffic management system to perform operations. The traffic management system receives, via a traffic congestion monitor, from a plurality of VNFs, a plurality of traffic congestion indicators. Each of the plurality of traffic congestion indicators includes a traffic congestion state indicative of network traffic congestion experienced by one or more of the plurality of VNFs. The traffic management system also can generate, by the traffic congestion monitor, an aggregate traffic congestion indicator based upon the plurality of traffic congestion indicators. The aggregate traffic congestion indicator is indicative of an aggregate network traffic congestion experienced by the plurality of VNFs. The traffic management system also can provide, by the traffic congestion monitor, the aggregate traffic congestion indicator to a traffic congestion analyzer. The traffic management system also can analyze, by the traffic congestion analyzer, the aggregate traffic congestion indicator to determine one or more traffic management actions to be taken to alleviate at least a portion of the aggregate network traffic congestion experienced by the plurality of VNFs. The traffic management system also can instruct, by the traffic congestion analyzer, a traffic congestion action responder to provide the traffic management action to be taken to alleviate at least the portion of the aggregate network traffic congestion. The traffic management system also can instruct, by the traffic congestion action responder, at least a portion of the plurality of VNFs to perform the traffic management action(s).

In some embodiments, the traffic management system also can receive, by the traffic congestion analyzer, one or more policies from a policy system. In these embodiments, the traffic congestion analyzer can analyze the aggregate traffic congestion indicator in accordance with the policy.

In some embodiments, the traffic management system also can receive, by the traffic congestion analyzer, one or more events from an external event system, and can analyze, by the traffic congestion analyzer, the event received from the external event system to determine the traffic management action(s) to be taken to alleviate at least the portion of the network traffic congestion.

In some embodiments, the traffic management system also can increase a traffic capacity of a VNF of the plurality of VNFs to support at least a portion of the aggregate network traffic congestion associated with the VNF at least in part by reducing the traffic capacity of another VNF and re-provisioning a reduced portion of the traffic capacity of the other VNF to increase the traffic capacity of the VNF.

In some embodiments, the traffic management action can include relaxing a delivery time requirement for service delivery by a VNF of the plurality of VNFs that is congested above a high congestion threshold and tightening a further delivery time requirement for service delivery by a further VNF of the plurality of VNFs that is congested below a low congestion threshold.

In some embodiments, the traffic management action can include redirecting network traffic, which has a non-real-time performance requirement that is contributing to the network traffic congestion, from the VNF to another VNF that is more congested.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
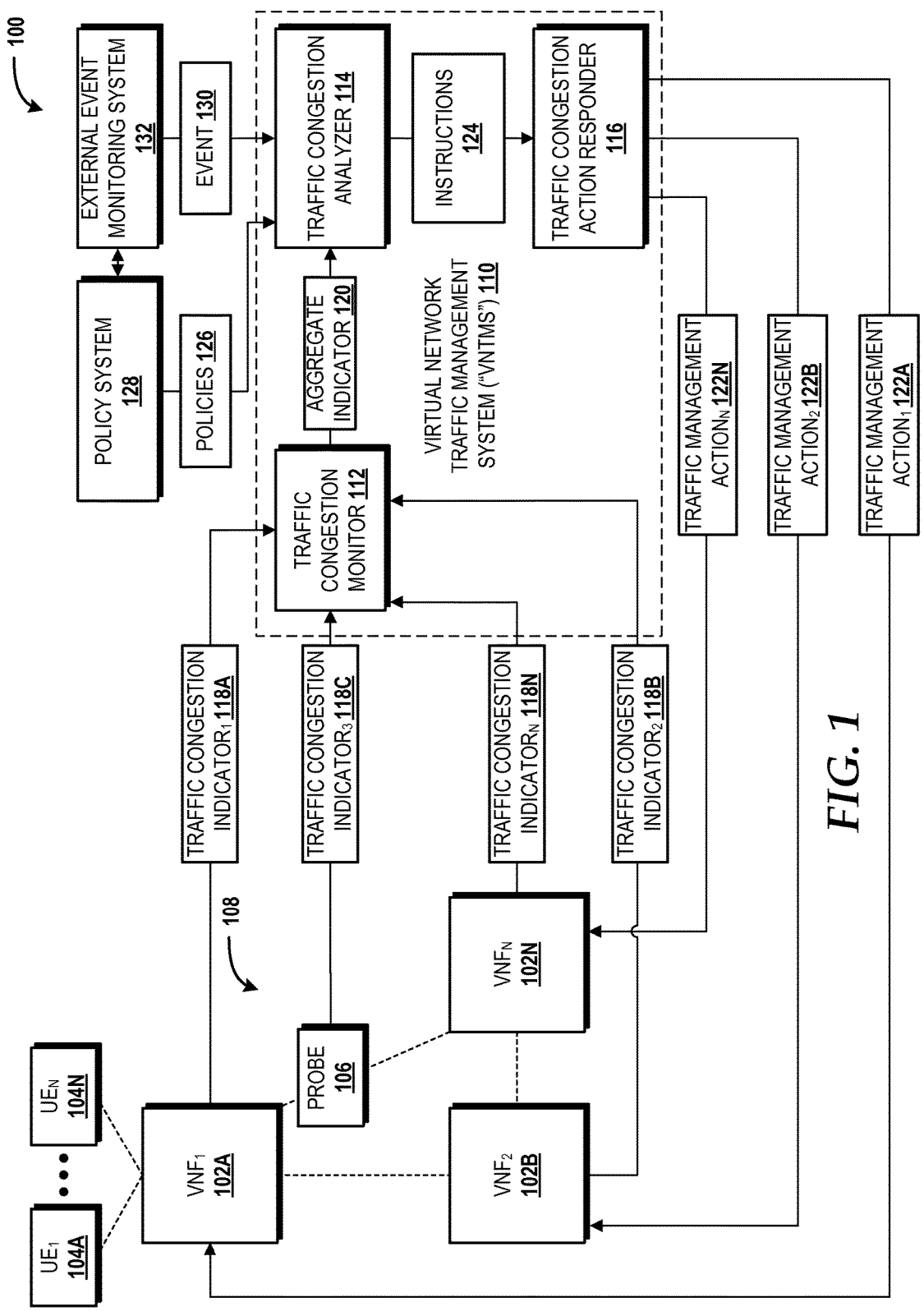
FIG. 1 is a block diagram illustrating aspects of an illustrative operating environment in which the various concepts and technologies disclosed herein can be implemented.

Turning now to FIG. 1, aspects of an illustrative operating environment 100 in which the various concepts and technologies disclosed herein can be implemented will be described. The illustrated operating environment 100 includes a plurality of virtual network functions ("VNFs") 102A-102N (collectively, VNFs 102) that provide, at least in part, one or more services to a plurality of user equipment ("UEs") 104A-104N (collectively, UEs 104). The VNFs 102 can provide fundamental network capabilities, some examples of which include, but are not limited to, firewalls, load balancers, routing elements, switching elements, combinations thereof, and the like. Each of the UEs 104 can be a cellular phone, a feature phone, a smartphone, a mobile computing device, a tablet computing device, a portable television, a portable video game console, or the like. The services provided, at least in part, by the VNFs 102 can be or can include any wired or wireless telecommunications service, although the latter is used as an illustrative example of the concepts and technologies disclosed herein. Network traffic between VNFs 102, such as network traffic between the $VNF_1$ 102A and the $VNF_N$ 102N in the illustrated example, can be monitored by one or more probes 106. The probe(s) 106 can be used to learn about a state (e.g., a traffic congestion state) of at least a portion of a virtual network (shown generally as 108) provided, at least in part, by the VNFs 102.

Network traffic associated with the service(s) provided by the virtual network 108 is managed by a virtual network traffic management system ("VNTMS") 110. In the illustrated embodiment, the VNTMS 110 includes a traffic congestion monitor 112, a traffic congestion analyzer 114, and a traffic congestion action responder 116. Each of these components of the VNTMS 110 can be independent software modules that are executable by one or more virtual machines that, in turn, are executable by a set of hardware resources provided, at least in part, by a network functions virtualization ("NFV") platform (best shown in FIG. 2). Although these components are illustrated and described as independent software modules that can be executed by different virtual machines, the functionality of the software modules can be combined in any way.

The traffic congestion monitor 112 can monitor network traffic experienced by the VNFs 102 and captured by the probe(s) 106. In particular, the traffic congestion monitor 112 can receive, from one or more of the VNFs 102 and/or the probe(s) 106, one or more traffic congestion indicators 118A-118N (collectively traffic congestion indicators 118). The traffic congestion indicators 118 include a traffic congestion state indicative of network traffic congestion experienced by a particular one of the VNFs 102 or a link between two or more of the VNFs 102. In the illustrated example, the $VNF_1$ 102A determines a traffic congestion state indicative of network traffic congestion experienced by the $VNF_1$ 102A and generates a traffic congestion $indicator_1$ 118A that includes the traffic congestion state. Similarly, the $VNF_2$ 102B determines a traffic congestion state indicative of network traffic congestion experienced by the $VNF_2$ 102B and generates a traffic congestion $indicator_2$ 118B including that traffic congestion state. The $VNF_N$ 102N also determines a traffic congestion state indicative of network traffic congestion experienced by the $VNF_N$ 102N and generates a traffic congestion $indicator_N$ 118N including that traffic congestion state. Additionally, the probe(s) 106 can determine a traffic congestion state on one or more tapped links (such as the link between the $VNF_1$ 102A and the $VNF_N$ 102N in the illustrated example) and can generate a traffic congestion $indicator_3$ 118C including that traffic congestion state.

The traffic congestion monitor 112 can receive the traffic congestion indicators 118 and can aggregate the traffic congestion indicators 118 into an aggregate indicator 120. The traffic congestion monitor 112 then provides the aggregate indicator 120 to the traffic congestion analyzer 114. Alternatively, the traffic congestion monitor 112 can receive and pass one or more of the traffic congestion indicators 118 to the traffic congestion analyzer 114 without aggregation.

The traffic congestion analyzer 114 receives the aggregate indicator 120 or one or more of the traffic congestion indicators 118 individually. The former will be used to continue this example, which should not be construed as being limiting in any way. The traffic congestion analyzer 114 analyzes the aggregate indicator 120 to determine one or more traffic management actions 122A-122N (collectively, traffic management actions 122) to be taken to alleviate at least a portion of the network traffic congestion experienced by one or more of the VNFs 102. The traffic congestion analyzer 114 generates instructions 124 to instruct the traffic congestion action responder 116 to provide the traffic management action(s) 122 to the appropriate one or more of the VNFs 102.

A traffic management action 122 can include a request to reconfigure at least a portion of the virtual network 108. A reconfiguration can include redirecting network traffic from a highly congested VNF of the VNFs 102 and/or a link to a less congested VNF of the VNFs 102 and/or a link. A VNF 102 can be considered highly congested if utilization is above a threshold (e.g., 95% utilization of a given capacity). For example, if the $VNF_1$ 102A is highly congested based upon a utilization above a threshold, network traffic can be redirected from the $VNF_1$ 102A to the $VNF_2$ 102B and/or to the $VNF_N$ 102N.

A traffic management action 122 can include a request to re-provision VNF capacity from one of the VNFs 102 to one or more other VNFs 102. A re-provisioning of VNF capacity can include increasing a capacity of one or more of the VNFs 102 (e.g., the $VNF_1$ 102A) to alleviate, at least in part, network traffic congestion associated with the $VNF_1$ 102A at least in part by reducing a traffic capacity of another one or more of the VNFs 102 (e.g., the $VNF_2$ 102B) and re-provisioning a reduced portion of that traffic capacity to increase the traffic capacity of the $VNF_1$ 102A.

A traffic management action 122 can include a request to reconfigure a performance requirement of one or more of the VNFs 102. In some embodiments, the performance requirement includes a service delivery time requirement, which can vary depending upon the service type—that is, real-time or non-real-time. Real-time services can include, but are not limited to, voice over internet protocol ("VoIP") service, streaming video service, videoconferencing service, online gaming service, chatting service, instant messaging ("IM") service, and other services that are latency sensitive. Non-real-time services can include, but are not limited to, buffered video streaming, e-mail, and other services that are not latency sensitive. For example, a reconfiguration can include relaxing a delivery time requirement (e.g., from real-time to non-real-time) for service delivery, at least in part, via a highly congested VNF. A reconfiguration alternatively can include, for example, tightening a delivery time requirement (e.g., from non-real-time to real-time) for service delivery, at least in part, via a less congested VNF.

A traffic management action 122 can include a request to redirect network traffic that has a real-time performance requirement from one of the VNFs 102 to another one of the VNFs 102 that is less congested. Similarly, a traffic management action 122 can include a request to redirect network traffic that has a non-real-time performance requirement from one of the VNFs 102 to another one of the VNFs 102 that is more congested.

The traffic congestion action responder 116 can receive the instructions 124 from the traffic congestion analyzer 114. In response, the traffic congestion action responder 116 can provide one or more of the VNFs 102 with one or more of the traffic management actions 122 to be taken to alleviate at least a portion of the network congestion experiences by the VNF(s) 102.

The illustrated VNTMS 110, via the traffic congestion analyzer 114, can receive one or more policies 126 from a policy system 128. The policies 126, as used herein, can include one or more settings, one or more configurations, one or more rules, and/or the like that define, at least in part, one or more courses or methods of action to be taken in light of one or more conditions to be used in a determination made by the traffic congestion analyzer 114 regarding which of the traffic management action(s) 122 should be taken to alleviate, at least in part, the network traffic congestion experienced by one or more of the VNFs 102. In some embodiments, a policy 126 includes one or more rules that specify one or more if-then conditions by which to handle a particular situation. In some other embodiments, a policy includes one or more matrices of cause and effect conditions, tables of actions, or the like for responding to or otherwise dealing with certain stimuli.

The illustrated VNTMS 110, via the traffic congestion analyzer 114, can receive one or more events 130 from an external event monitoring system 132. The event(s) 130 can include event data associated with an upcoming real-world disaster and/or crisis such as, for example, a hurricane, tsunami, earthquake, tornado, other nature disaster, disease epidemic, and the like. The traffic congestion analyzer 114 can analyze the event data and utilize one or more of the traffic management actions 122 to prepare the virtual network 108 for additional traffic expected in light of the event(s) 130. Many sources of real-world external data can be collected by the external monitoring system 132 and can be conditioned by the policy system 128 to form the foundation for extensive policy/rule based automation of event identification, analysis, and action.

The policies 126 can be used for determining potential impacts from the events 130 due, at least in part, to the variability across event dimensions. Event dimensions can include, but are not limited to, event type, event location, event tracks/trajectories, event probability, population spread in the area(s) forecasted to be impacted, technologies forecasted to be impacted, customer locations, duration of the event, 2nd, $3^{rd}$, and greater order effects, and the like. Policy factors can include time scale differences in both preparation for the events 130 and "in-event," differences in process granularity and automation levels, policy/rule staging, adaptation, and "in-event" configurability.

The policies 126 can be used when multiple events are happening simultaneously and allow the VNTMS 110 to assess and determine the impact based upon a relative priority of the events from one event to another. The VNTMS 110 can manage and prioritize resources for multiple events so that high priority events will take precedence in comparison with lower priority events. The policy system 128 can determine the rules, conditions, and/or thresholds for traffic management for each event.

Figure 2:
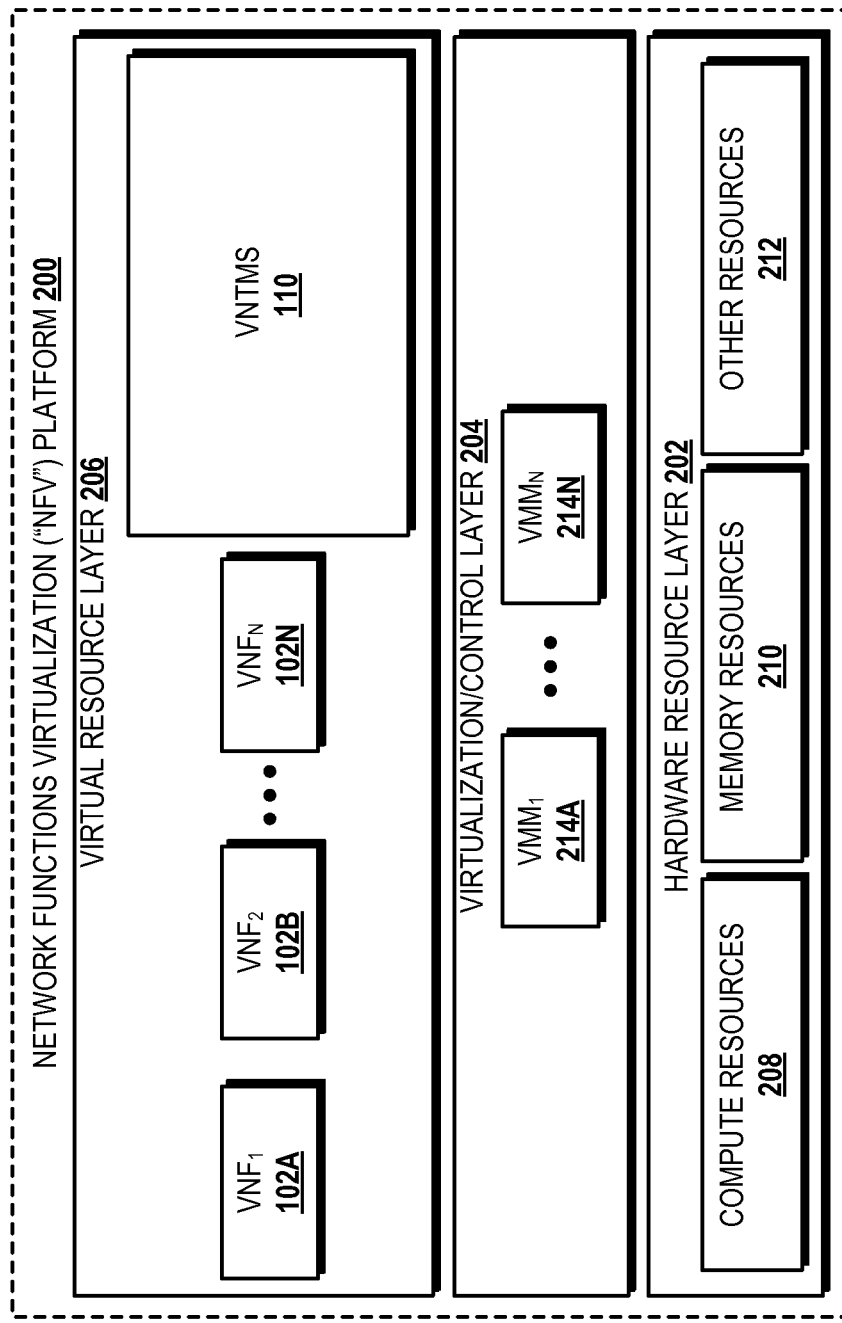
FIG. 2 is a block diagram illustrating aspects of a network functions virtualization ("NFV") platform, according to an illustrative embodiment.

Referring now to FIG. 2, aspects of a NFV platform 200 for implementing various embodiments of the concepts and technologies disclosed herein will be described. The illustrated NFV platform 200 includes a hardware resource layer 202, a virtualization/control layer 204, and a virtual resource layer 206. While connections are shown between some of the components illustrated in FIG. 2, it should be understood that some, none, or all of the components illustrated in FIG. 2 can be configured to interact with one another to carry out various operations described herein. Thus, it should be understood that FIG. 2 and the following description are intended to provide a general understanding of a suitable environment in which various aspects of embodiments can be implemented, and should not be construed as being limiting in any way.

The hardware resource layer 202 provides hardware resources, which, in the illustrated embodiment, include one or more compute resources 208, one or more memory resources 210, and one or more other resources 212. The compute resource(s) 208 can include one or more hardware components that perform computations to process data, and/or to execute computer-executable instructions of one or more application programs, operating systems, and/or other software. The compute resources 208 can include one or more central processing units ("CPUs") configured with one or more processing cores. The compute resources 208 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 208 can include one or more discrete GPUs. In some other embodiments, the compute resources 208 can include CPU and GPU components that are configured in accordance with a co-processing CPU/GPU computing model, wherein the sequential part of an application executes on the CPU and the computationally-intensive part is accelerated by the GPU. The compute resources 208 can include one or more system-on-chip ("SoC") components along with one or more other components, including, for example, one or more of the memory resources 210, and/or one or more of the other resources 212. In some embodiments, the compute resources 208 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 208 can be or can include one or more hardware components architected in accordance with an ARM architecture, available for license from ARM HOLDINGS of Cambridge, United Kingdom. Alternatively, the compute resources 208 can be or can include one or more hardware components architected in accordance with an x86 architecture, such an architecture available from INTEL CORPORATION of Mountain View, Calif., and others. Those skilled in the art will appreciate the implementation of the compute resources 208 can utilize various computation architectures, and as such, the compute resources 208 should not be construed as being limited to any particular computation architecture or combination of computation architectures, including those explicitly disclosed herein.

The memory resource(s) 210 can include one or more hardware components that perform storage operations, including temporary or permanent storage operations. In some embodiments, the memory resource(s) 210 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 208.

The other resource(s) 212 can include any other hardware resources that can be utilized by the compute resources(s) 208 and/or the memory resource(s) 210 to perform operations described herein. The other resource(s) 212 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 202 can be virtualized by one or more virtual machine monitors ("VMMs") 214A-214N (collectively VMMs 214; also known as "hypervisors") operating within the virtualization/control layer 204 to create one or more virtual resources that reside in the virtual resource layer 206. The VMMs 214 can be or can include software, firmware, and/or hardware that alone or in combination with other software, firmware, and/or hardware, creates one or more virtual resources operating within the virtual resource layer 206.

The virtual resources operating within the virtual resource layer 206 can include abstractions of at least a portion of the compute resources 208, the memory resources 210, and/or the other resources 212, or any combination thereof. In the illustrated embodiment, the virtual resource layer 206 includes one or more special-purpose virtual machines, including, for example, the VNFs 102A-102N. The VNFs 102A-102N can be virtualizations of any network functions that perform, at least in part, one or more operations to support one or more services, such as described above. The virtual resource layer 206 also includes the VNTMS 110.

Figure 3:
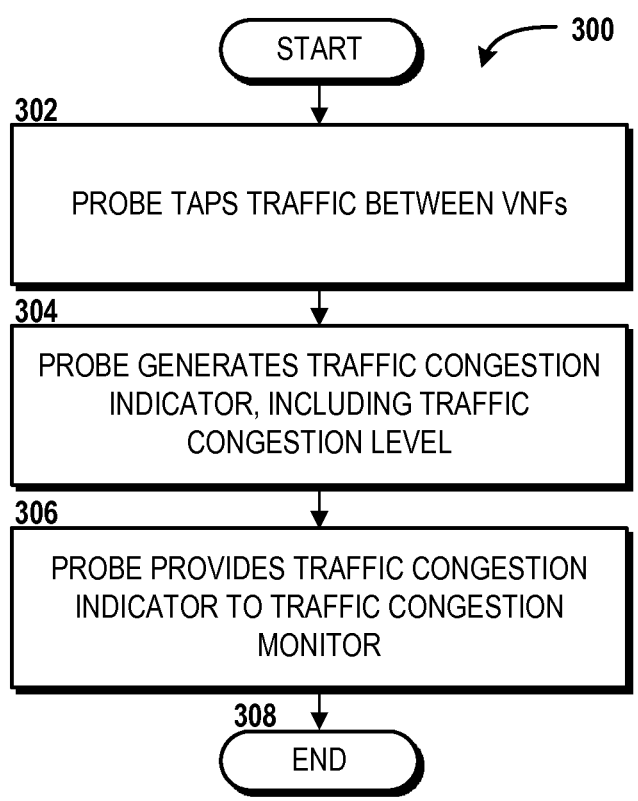
FIG. 3 is a flow diagram illustrating aspects of a method for operating a probe to alleviate network traffic congestion in a virtual network, according to an illustrative embodiment.

Turning now to FIG. 3, aspects of a method 300 for operating a probe, such as the probe 106, to alleviate network traffic congestion in the virtual network 108 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor, such as, for example, one of the compute resources 208 of the hardware resource layer 202, and/or a processor one or more other computing systems, devices, engines, or components disclosed herein to perform operations. It should be understood that the performance of one or more operations may include operations executed by one or more virtual processors at the instructions of one or more of the aforementioned hardware processors.

The method 300 will be described with reference to FIG. 3 and further reference to FIG. 1. The method 300 begins at operation 302, where the probe 106 taps traffic on a link between two or more of the VNFs 102. In the example shown in FIG. 1, the probe 106 taps traffic on a link between the $VNF_1$ 102A and the $VNF_N$ 102N. From operation 302, the method 300 proceeds to operation 304, where the probe 106 generates a traffic congestion indicator, such as the traffic congestion indicator$_3$ 118C. From operation 304, the method 300 proceeds to operation 306, where the probe 106 provides the traffic congestion indicator$_3$ 118C, to the traffic congestion monitor 112. From operation 306, the method 300 proceeds to operation 308, where the method 300 ends.

Figure 4:
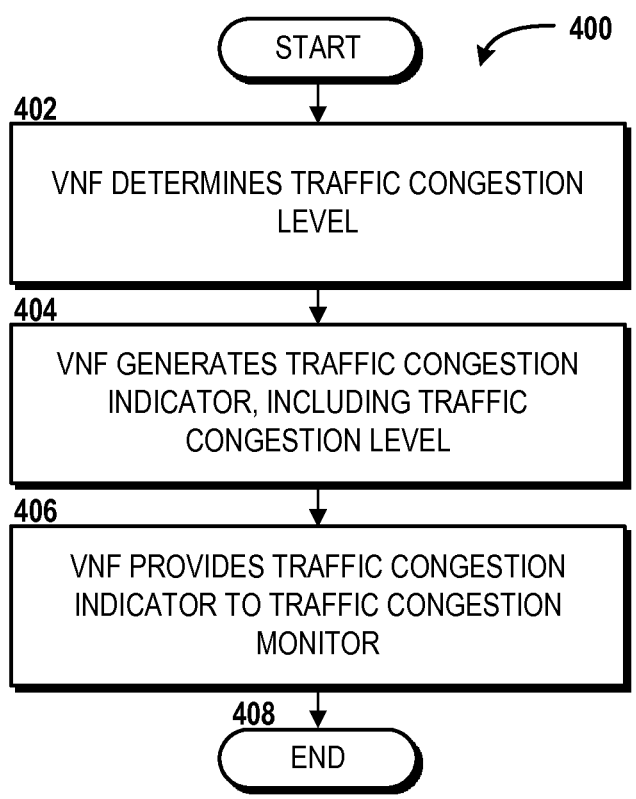
FIG. 4 is a flow diagram illustrating aspects of a method for operating a virtual network function ("VNF") to alleviate network traffic congestion in a virtual network, according to an illustrative embodiment.

Turning now to FIG. 4, a flow diagram illustrating aspects of a method 400 for operating a VNF, such as one of the VNFs 102, to alleviate at least a portion of the network traffic congestion in the virtual network 108 will be described, according to an illustrative embodiment. The method 400 will be described with reference to FIG. 4 and further reference to FIG. 1. The method 400 begins and proceeds to operation 402, where the VNF 102 determines a traffic congestion level. From operation 402, the method 400 proceeds to operation 404, where the VNF 102 generates a traffic congestion indicator, such as one of the traffic congestion indicators 118, including the traffic congestion level. From operation 404, the method 400 proceeds to operation 406, where the VNF 102 provides the traffic congestion indicator 118 to the traffic congestion monitor 112. From operation 406, the method 400 proceeds to operation 408, where the method 400 ends.

Figure 5:
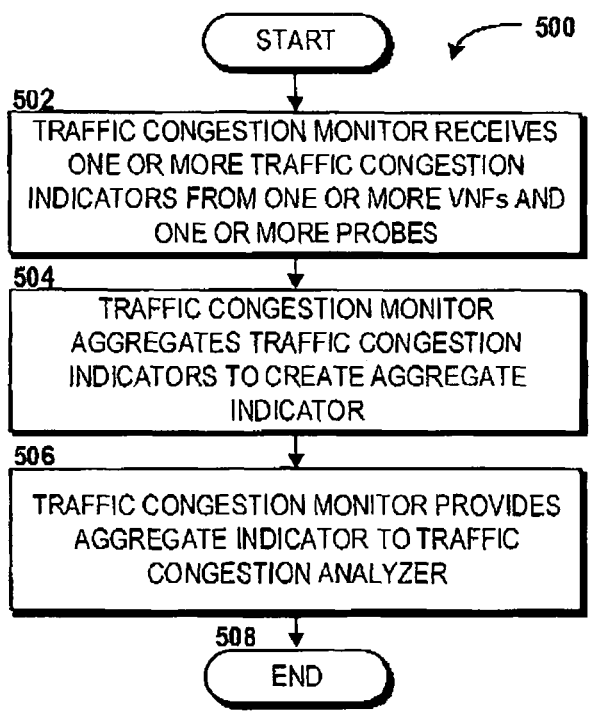
FIG. 5 is a flow diagram illustrating aspects of a method for operating a traffic congestion monitor to alleviate network traffic congestion in a virtual network, according to an illustrative embodiment.

Turning now to FIG. 5, a flow diagram illustrating aspects of a method 500 for operating the traffic congestion monitor 112 to alleviate network traffic congestion in the virtual network 108 will be described, according to an illustrative embodiment. The method 500 will be described with reference to FIG. 5 and further reference to FIG. 1. The method 500 begins and proceeds to operation 502, where the traffic congestion monitor 112 receives one or more traffic congestion indicators, such as one or more of the traffic congestion indicators 118, from one or more of the VNFs 102 and one or more probes, such as the probe 106. From operation 502, the method 500 proceeds to operation 504, where the traffic congestion monitor 112 aggregates the traffic congestion indicators 118 to create the aggregate indicator 120. From operation 504, the method 500 proceeds to operation 506, where the traffic congestion monitor 112 provides the aggregate indicator 120 to the traffic congestion analyzer 114. From operation 506, the method 500 proceeds to operation 508, where the method 500 ends.

Figure 6:
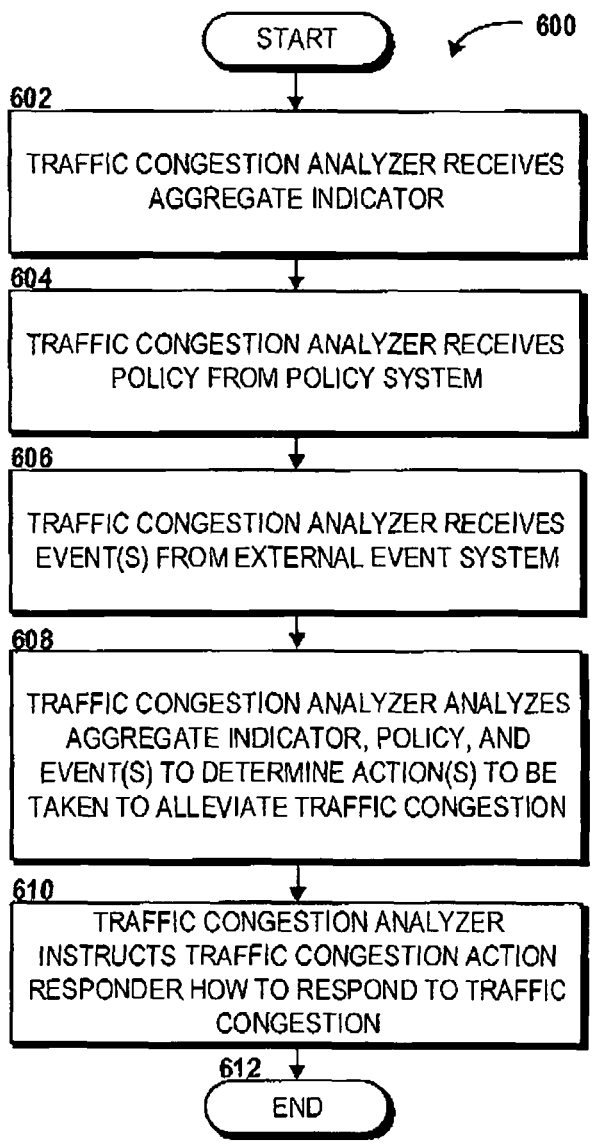
FIG. 6 is a flow diagram illustrating aspects of a method for operating a traffic congestion analyzer to alleviate network traffic congestion in a virtual network, according to an illustrative embodiment.

Turning now to FIG. 6, a flow diagram illustrating aspects of a method 600 for operating the traffic congestion analyzer 114 to alleviate, at least in part, network traffic congestion in the virtual network 108 will be described, according to an illustrative embodiment. The method 600 will be described with reference to FIG. 6 and further references to FIG. 1. The method 600 begins and proceeds to operation 602, where the traffic congestion analyzer 114 receives the aggregate indicator 120 from the traffic congestion monitor 112.

From operation 602, the method 600 proceeds to operation 604, where the traffic congestion analyzer 114 receives one or more policies, such as one or more of the policies 126 from the policy system 128. From operation 604, the method 600 proceeds to operation 606, where the traffic congestion analyzer 114 receives one or more events, such as one or more of the events 130, from the external event monitoring system 132. From operation 606, the method 600 proceeds to operation 608, where the traffic congestion analyzer 114 analyzes the aggregate indicator 120, the policy/policies 126, and the event(s) 130 to determine one or more actions to be taken to alleviate, at least in part, the network traffic congestion. From operation 608, the method 600 proceeds to operation 610, where the traffic congestion analyzer 114 instructs the traffic congestion action responder 116 how to respond to the network traffic congestion. From operation 610, the method 600 proceeds to operation 612, where the method 600 ends.

Figure 7:
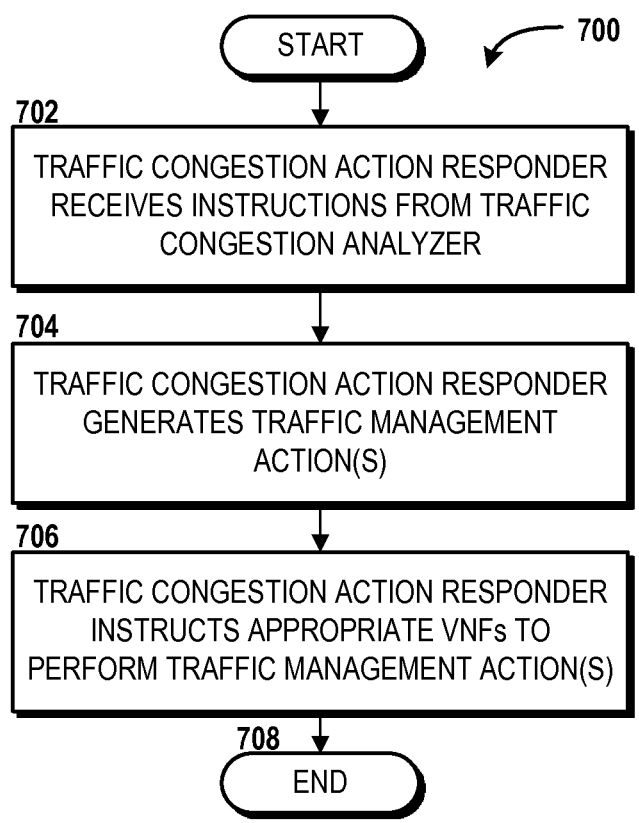
FIG. 7 is a flow diagram illustrating aspects of a method for operating a traffic congestion action responder to alleviate network traffic congestion in a virtual network, according to an illustrative embodiment.

Turning now to FIG. 7, a flow diagram illustrating aspects of a method 700 for operating the traffic congestion action responder 116 to alleviate the network traffic congestion in the virtual network 108 will be described, according to an illustrative embodiment. The method 700 will be described with reference to FIG. 7 and further references to FIG. 1. The method 700 begins and proceeds to operation 702, where the traffic congestion action responder 116 receives instructions from the traffic congestion analyzer 114. From operation 702, the method 700 proceeds to operation 704, where the traffic congestion action responder 116 generates one or more traffic management actions, such as one or more of the traffic management actions 122. From operation 704, the method 700 proceeds to operation 706, where the traffic congestion action responder 116 provides the traffic management action(s) 122 to an appropriate one or more of the VNFs 102 to carry out the action. From operation 706, the method 700 proceeds to operation 708, where the method 700 ends.

Figure 8:
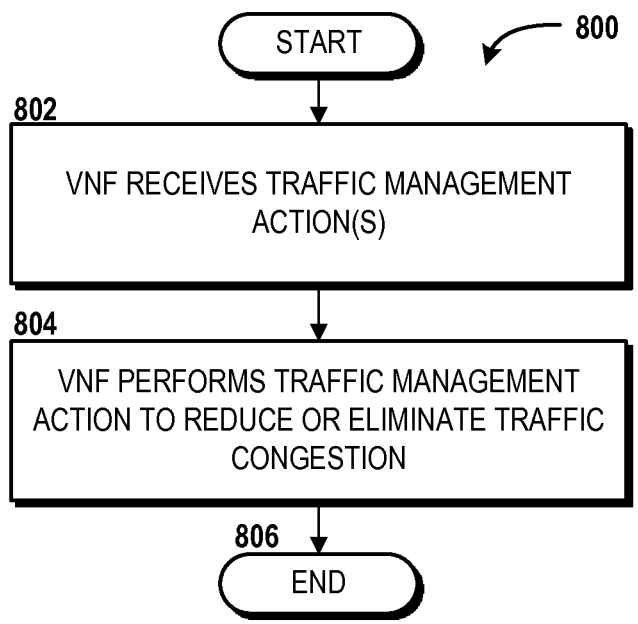
FIG. 8 is a flow diagram illustrating aspects of another method for operating a VNF to alleviate network traffic congestion in a virtual network, according to an illustrative embodiment.

Turning now to FIG. 8, a flow diagram illustrating aspects another method 800 for operating a VNF, such as one of the VNFs 102, to alleviate network traffic congestion in the virtual network 108 will be described, according to an illustrative embodiment. The method 800 will be described with reference to FIG. 8 and further references to FIG. 1. The method 800 begins and proceeds to operation 802, where the VNF 102 receives one or more of the traffic management actions 122 from the traffic congestion action responder 116. From operation 802, the method 800 proceeds to operation 804, where the VNF 102 performs the traffic management action(s) 122 to alleviate, at least in part, the network traffic congestion. From operation 804, the method 800 proceeds to operation 806, where the method 800 ends.

Figure 9:
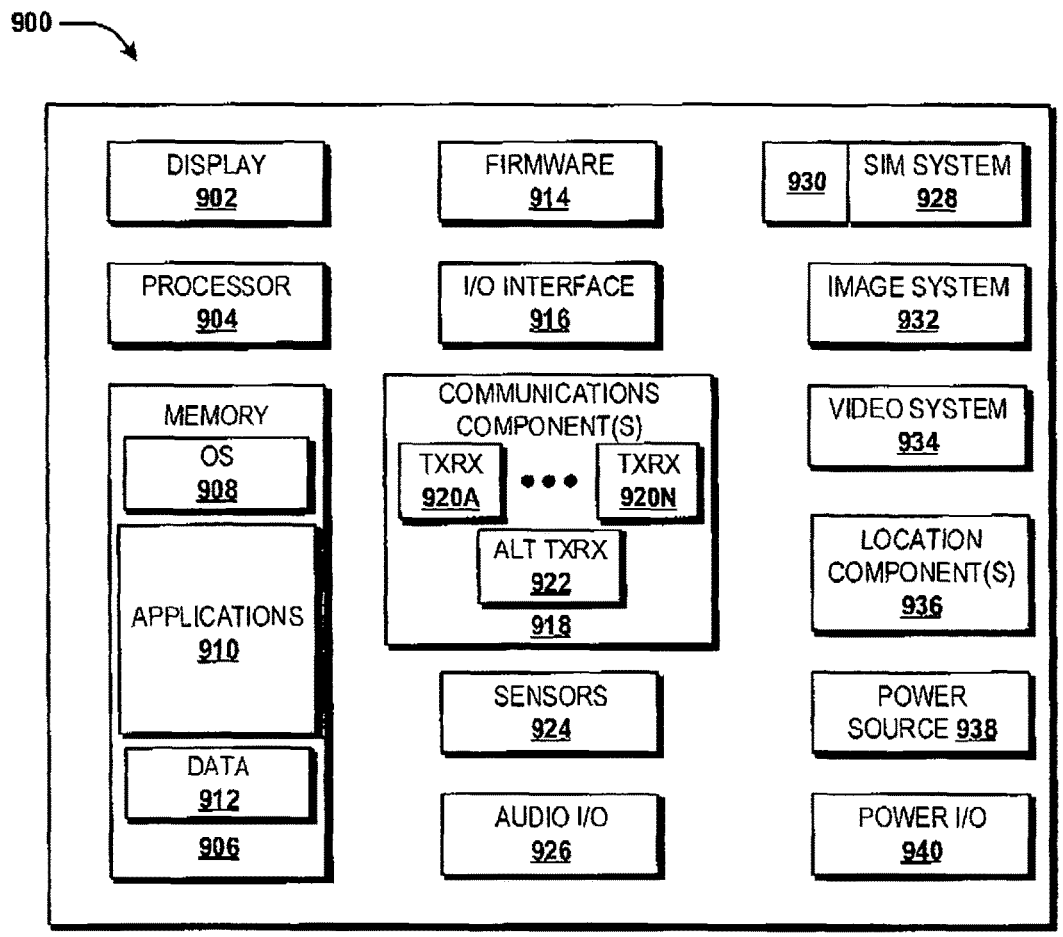
FIG. 9 is a block diagram illustrating an example mobile device capable of implementing aspects of the embodiments disclosed herein.

Turning now to FIG. 9, an illustrative mobile device 900 and components thereof will be described. The method 900 will be described with reference to FIG. 9 and further references to FIG. 1. In some embodiments, one or more of the UEs 104A-104N (shown in FIG. 1) can be configured like the mobile device 900. While connections are not shown between the various components illustrated in FIG. 9, it should be understood that some, none, or all of the components illustrated in FIG. 9 can be configured to interact with one other to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910, other computer-executable instructions stored in a memory 906, or the like. In some embodiments, the applications 910 also can include a user interface ("UI") application (not illustrated in FIG. 9).

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering content, viewing account information, answering/initiating calls, entering/deleting data, entering and setting user IDs and passwords for device access, configuring settings, manipulating address book content and/or settings, multimode interaction, interacting with other applications 910, and otherwise facilitating user interaction with the operating system 908, the applications 910, and/or other types or instances of data 912 that can be stored at the mobile device 900. The data 912 can include, for example, one or more identifiers, and/or other applications or program modules. According to various embodiments, the data 912 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, user information, organization information, presence status information, user IDs, passwords, and application initiation (start-up) requests. In some embodiments, the I/O interface 916 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 918 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 918 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-920N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, chargecoupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

Figure 10:
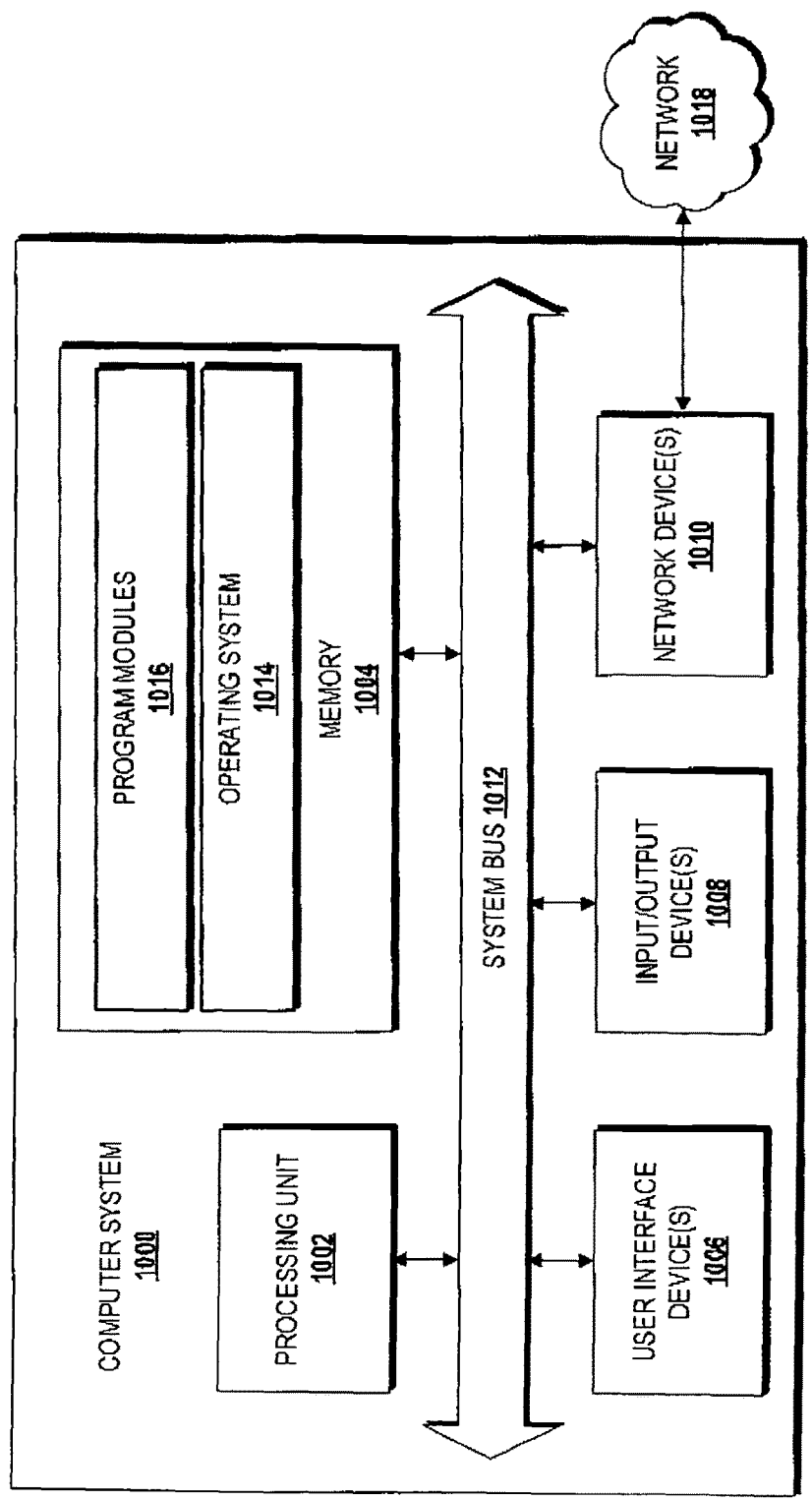
FIG. 10 is a block diagram illustrating an example computer system capable of implementing aspects of the embodiments presented herein.

FIG. 10 is a block diagram illustrating a computer system 1000 configured to provide the functionality in accordance with various embodiments of the concepts and technologies disclosed herein. In some implementations, the hardware resource layer 202 (illustrated in FIG. 1) includes one or more computers that are configured like the architecture of the computer system 1000. The computer system 1000 may provide at least a portion of the compute resources 208, the memory resources 210, and/or the other resources 212. It should be understood, however, that modification to the architecture may be made to facilitate certain interactions among elements described herein.

The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 208 (illustrated in FIG. 2) can include one or more processing units 1002.

The memory 1004 communicates with the processing unit 1002 via the system bus 1012. In some embodiments, the memory 1004 is operatively connected to a memory controller (not shown) that enables communication with the processing unit 1002 via the system bus 1012. The memory resources 210 can include one or more instances of the memory 1004. The illustrated memory 1004 contains an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1016 may include various software and/or program modules to perform the various operations described herein. The program modules 1016 and/or other programs can be embodied in computer-readable media containing instructions that, when executed by the processing unit 1002, perform various operations such as those described herein. According to embodiments, the program modules 1016 may be embodied in hardware, software, firmware, or any combination thereof.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium" and variations thereof does not include waves or signals per se and/or communication media.

The user interface devices 1006 may include one or more devices with which a user accesses the computer system 1000. The user interface devices 1006 may include, but are not limited to, computers, servers, PDAs, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer. In some embodiments, the I/O devices 1008 can be used for manual controls for operations to exercise under certain emergency situations.

The network devices 1010 enable the computer system 1000 to communicate with other networks or remote systems via a network 1018. Examples of the network devices 1010 include, but are not limited to, a modem, a radio frequency ("RF") or infrared ("IR") transceiver, a telephonic interface, a bridge, a router, or a network card. The network 1018 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1018 may be a wired network such as, but not limited to, a Wide Area Network ("WAN"), a wired Personal Area Network ("PAN"), or a wired Metropolitan Area Network ("MAN"). The network 1018 may be any other network described herein.

Figure 11:
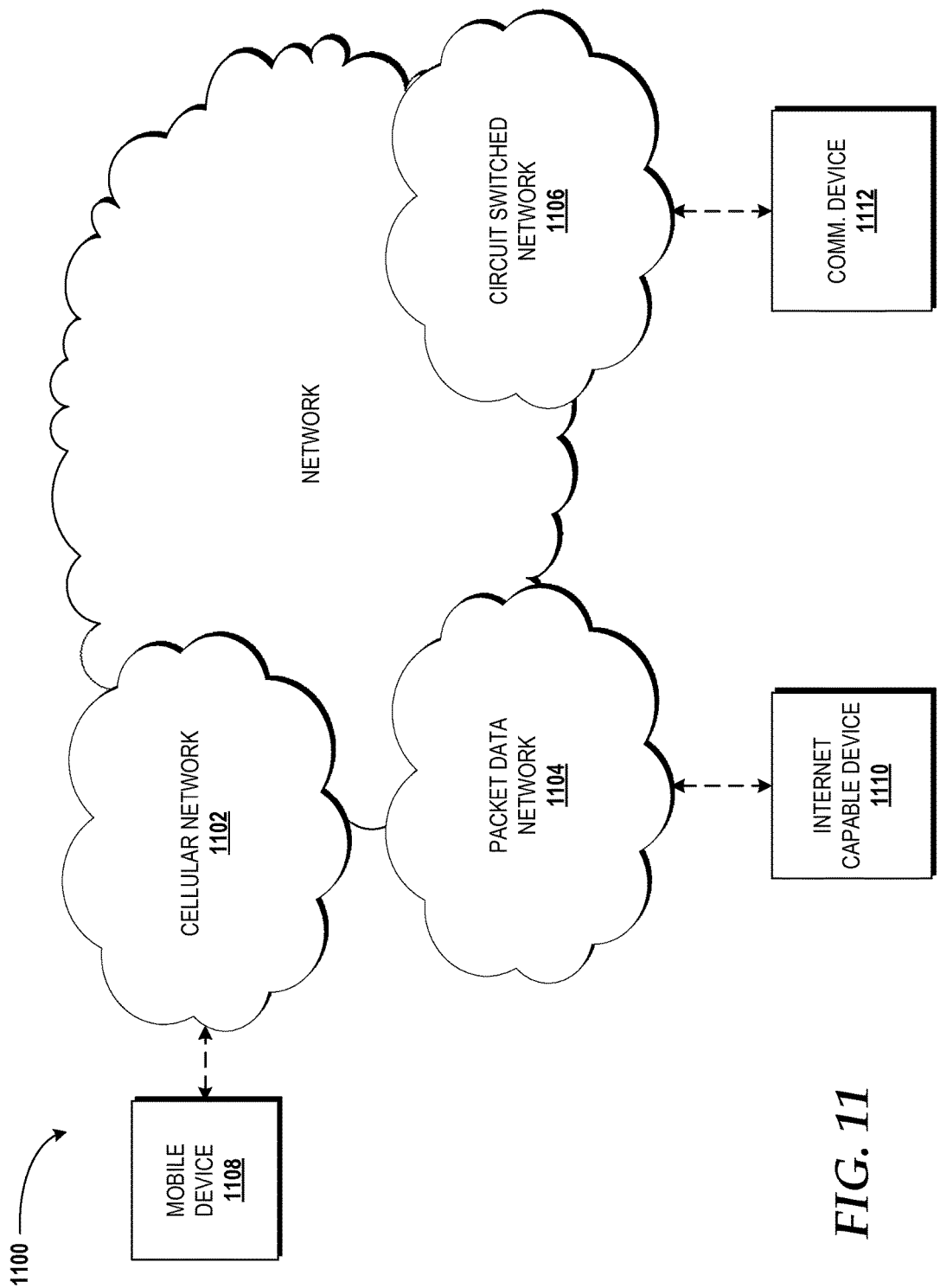
FIG. 11 is a diagram illustrating a network, according to an illustrative embodiment.

Turning now to FIG. 11, details of a network 1100 are illustrated, according to an illustrative embodiment. The network 1100 includes a cellular network 1102, a packet data network 1104, for example, the Internet, and a circuit switched network 1106, for example, a public switched telephone network ("PSTN"). The cellular network 1102 includes various components such as, but not limited to, base transceiver stations ("BTSs"), nodeBs or enodeBs, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1102 also includes radios and nodes for receiving and transmitting voice, video data, and combinations thereof to and from radio transceivers, networks, the packet data network 1104, and the circuit switched network 1106.

A mobile communications device 1108, such as, for example, one or more of the UEs 104, a cellular telephone, a user equipment, a mobile terminal, a PDA, a laptop computer, a handheld computer, and combinations thereof, can be operatively connected to the cellular network 1102. The cellular network 1102 can be configured as a 2G GSM network and can provide data communications via GPRS and/or EDGE. Additionally, or alternatively, the cellular network 1102 can be configured as a 3G UMTS network and can provide data communications via the HSPA protocol family, for example, HSDPA, EUL (also referred to as HSUPA), and HSPA+. The cellular network 1102 also is compatible with 4G mobile communications standards such as LTE, or the like, as well as evolved and future mobile standards.

The packet data network 1104 includes various devices, for example, servers, computers, databases, routers, packet gateways, and other devices in communication with one another, as is generally known. The packet data network 1104 can be or can include the virtual network 108. The packet data network 1104 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1104 includes or is in communication with the Internet. The circuit switched network 1106 includes various hardware and software for providing circuit switched communications. The circuit switched network 1106 may include, or may be, what is often referred to as a plain old telephone system ("POTS"). The functionality of a circuit switched network 1106 or other circuit-switched network are generally known and will not be described herein in detail.

The illustrated cellular network 1102 is shown in communication with the packet data network 1104 and a circuit switched network 1106, though it should be appreciated that this is not necessarily the case. One or more Internet-capable devices 1110, for example, a PC, a laptop, a portable device, or another suitable device, can communicate with one or more cellular networks 1102, and devices connected thereto, through the packet data network 1104. It also should be appreciated that the Internet-capable device 1110 can communicate with the packet data network 1104 through the circuit switched network 1106, the cellular network 1102, and/or via other networks (not illustrated).

As illustrated, a communications device 1112, for example, telephone, facsimile machine, modem, computer, or the like, can be in communication with the circuit switched network 1106, and therethrough to the packet data network 1104 and/or the cellular network 1102. It should be appreciated that the communications device 1112 can be an Internet-capable device, and can be substantially similar to the Internet-capable device 1110.

Based on the foregoing, it should be appreciated that concepts and technologies directed to NFV leveraging unified traffic management and real-world event planning have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A virtual network traffic management system comprising:
   a traffic congestion monitor, a traffic congestion analyzer, a traffic congestion action responder, and a plurality of probes, all of which are executable by a network functions virtualization platform comprising a plurality of hardware resources;
   wherein the traffic congestion monitor, when executed by the network functions virtualization platform, causes the network functions virtualization platform to perform operations comprising
      receiving, from a probe of the plurality of probes, a traffic congestion indicator comprising a traffic congestion state indicative of network traffic congestion experienced by a link between at least two virtual network functions of a plurality of virtual network functions that form, at least in part, a wireless telecommunications network that provides a wireless telecommunications service and that are executable by the network functions virtualization platform, and
      providing the traffic congestion indicator to the traffic congestion analyzer;
   wherein the traffic congestion analyzer, when executed by the network functions virtualization platform, causes the network functions virtualization platform to perform operations comprising
      analyzing the traffic congestion indicator to determine a traffic management action to be taken to alleviate at least a portion of the network traffic congestion experienced by the link between the at least two virtual network functions of the plurality of virtual network functions, and
      instructing the traffic congestion action responder to provide the traffic management action to at least one virtual network function of the at least two virtual network functions of the plurality of virtual network functions; and
   wherein the traffic congestion action responder, when executed by the network functions virtualization platform, causes the network functions virtualization platform to perform operations comprising providing the at least one virtual network function of the at least two virtual network functions of the plurality of virtual network functions with the traffic management action to be taken to alleviate at least a portion of the network traffic congestion experienced by the link between the at least two virtual network functions of the plurality of virtual network functions.

2. The virtual network traffic management system of claim 1, wherein the traffic congestion analyzer, when executed by the network functions virtualization platform, causes the network functions virtualization platform to perform operations further comprising receiving a policy from a policy system; and wherein analyzing the traffic congestion indicator to determine the traffic management action to be taken to alleviate at least the portion of the network traffic congestion experienced by the link between the at least two virtual network functions of the plurality of virtual network functions further comprises analyzing, in accordance with the policy, the traffic congestion indicator to determine the traffic management action to be taken to alleviate at least the portion of the network traffic congestion experienced by the link between the at least two virtual network functions of the plurality of virtual network functions.

3. The virtual network traffic management system of claim 1, wherein the traffic congestion analyzer, when executed by the network functions virtualization platform, causes the network functions virtualization platform to perform operations further comprising:
   receiving an event from an external event system; and
   analyzing the event received from the external event system to determine the traffic management action to be taken to alleviate at least the portion of the network traffic congestion experienced by the link between the at least two virtual network functions of the plurality of virtual network functions.

4. The virtual network traffic management system of claim 1, wherein the traffic management action comprises increasing a traffic capacity of the at least one virtual network function of the at least two virtual network functions of the plurality of virtual network functions to support the network traffic congestion.

5. The virtual network traffic management system of claim 4, wherein the traffic management action further comprises reducing a further traffic capacity of a further virtual network function of the plurality of virtual network functions.

6. The virtual network traffic management system of claim 1, wherein the traffic management action comprises relaxing a delivery time requirement for service delivery by the at least one virtual network function of the at least two virtual network functions of the plurality of virtual network functions.

7. The virtual network traffic management system of claim 6, wherein the traffic management action further comprises tightening a further delivery time requirement for the service delivery by a further virtual network function of the plurality of virtual network functions.

8. The virtual network traffic management system of claim 1, wherein the traffic management action comprises redirecting network traffic, which has a real-time performance requirement that is contributing to the network traffic congestion, from the at least one virtual network function of the at least two virtual network functions of the plurality of virtual network functions to a further virtual network function of the plurality of virtual network functions, wherein the further virtual network function of the plurality of virtual network functions is less congested than the at least one virtual network function of the at least two virtual network functions of the plurality of virtual network functions.

9. The virtual network traffic management system of claim 1, wherein the traffic management action comprises redirecting network traffic, which has a non-real-time performance requirement that is contributing to the network traffic congestion, from the at least one virtual network function of the at least two virtual network functions of the plurality of virtual network functions to a further virtual network function of the plurality of virtual network functions, wherein the further virtual network function of the plurality of virtual network functions is more congested than the at least one virtual network function of the at least two virtual network functions of the plurality of virtual network functions.

10. The virtual network traffic management system of claim 1, wherein:

the traffic congestion monitor, when executed by the network functions virtualization platform, causes the network functions virtualization platform to perform operations further comprising receiving, from a further virtual network function of the plurality of virtual network functions that is executable by the network functions virtualization platform, a further traffic congestion indicator, wherein the further traffic congestion indicator comprises a further traffic congestion state indicative of further network traffic congestion experienced by the further virtual network function of the plurality of virtual network functions, generating an aggregated traffic congestion indicator based upon the traffic congestion indicator and the further traffic congestion indicator, and providing the aggregated traffic congestion indicator to the traffic congestion analyzer; and wherein analyzing the traffic congestion indicator to determine the traffic management action to be taken to alleviate at least the portion of the network traffic congestion experienced by the link between the at least two virtual network functions of the plurality of virtual network functions comprises analyzing the aggregated traffic congestion indicator to determine the traffic management action to be taken to alleviate at least the portion of the network traffic congestion experienced by the link between the at least two virtual network functions of the plurality of virtual network functions and the further network traffic congestion experienced by the further virtual network function of the plurality of virtual network functions, and wherein instructing the traffic congestion action responder to provide the traffic management action to at least one of the at least two virtual network functions comprises instructing the traffic congestion action responder to provide the traffic management action to the at least one virtual network function of the at least two virtual network functions of the plurality of virtual network functions and to the further virtual network function.

11. A computer-readable storage medium comprising computer-executable instructions that, when executed by a compute resource of a network functions virtualization platform, causes a traffic management system to perform operations comprising:

receiving, by a traffic congestion monitor of the traffic management system, from a plurality of probes, a plurality of traffic congestion indicators, wherein each of the plurality of traffic congestion indicators comprises a traffic congestion state indicative of network traffic congestion experienced by a link between at least two virtual network functions of a plurality of virtual network functions that form, at least in part, a wireless telecommunications network that provides a wireless telecommunications service and that are executable by the network functions virtualization platform;

generating, by the traffic congestion monitor, an aggregate traffic congestion indicator based upon the plurality of traffic congestion indicators, wherein the aggregate traffic congestion indicator is indicative of an aggregate network traffic congestion;

providing, by the traffic congestion monitor, the aggregate traffic congestion indicator to a traffic congestion analyzer;

analyzing, by the traffic congestion analyzer, the aggregate traffic congestion indicator to determine a traffic management action to be taken to alleviate at least a portion of the aggregate network traffic congestion;

instructing, by the traffic congestion analyzer, a traffic congestion action responder to provide the traffic management action to be taken to alleviate at least the portion of the aggregate network traffic congestion; and instructing, by the traffic congestion action responder, at least a portion of the plurality of virtual network functions to perform the traffic management action.

12. The computer-readable storage medium of claim 11, wherein the operations further comprise receiving, by the traffic congestion analyzer, a policy from a policy system; and wherein analyzing, by the traffic congestion analyzer, the aggregate traffic congestion indicator to determine the traffic management action to be taken to alleviate at least the portion of the aggregate network traffic congestion further comprises analyzing, in accordance with the policy, the aggregate traffic congestion indicator to determine the traffic management action to be taken to alleviate at least the portion of the aggregate network traffic congestion.

13. The computer-readable storage medium of claim 11, wherein the operations further comprise:

receiving, by the traffic congestion analyzer, an event from an external event system; and analyzing, by the traffic congestion analyzer, the event received from the external event system to determine the traffic management action to be taken to alleviate at least the portion of the network traffic congestion.

14. The computer-readable storage medium of claim 11, wherein the traffic management action comprises increasing a traffic capacity of a virtual network function of the plurality of virtual network functions to support at least a portion of the aggregate network traffic congestion associated with the virtual network function of the plurality of virtual network functions at least in part by reducing a further traffic capacity of a further virtual network function of the plurality of virtual network functions and re-provisioning a reduced portion of the further traffic capacity of the further virtual network function of the plurality of virtual network functions to increase the traffic capacity of the virtual network function of the plurality of virtual network functions.

15. The computer-readable storage medium of claim 11, wherein the traffic management action comprises relaxing a delivery time requirement for service delivery by a virtual network function of the plurality of virtual network functions that is congested above a high congestion threshold and tightening a further delivery time requirement for service delivery by a further virtual network function of the plurality of virtual network functions that is congested below a low congestion threshold.

16. The computer-readable storage medium of claim 11, wherein the traffic management action comprises redirecting network traffic, which has a non-real-time performance requirement that is contributing to the network traffic congestion, from a virtual network function of the plurality of virtual network functions to a further virtual network function of the plurality of virtual network functions, wherein the further virtual network function of the plurality of virtual network functions is more congested than the virtual network function of the plurality of virtual network functions.

17. A method comprising:

receiving, by a traffic congestion monitor of a traffic management system executable by a compute resource of a network functions virtualization platform, from a plurality of probes, a plurality of traffic congestion indicators, wherein each of the plurality of traffic congestion indicators comprises a traffic congestion state indicative of network traffic congestion experienced by a link between at least two virtual network functions of a plurality of virtual network functions that form, at least in part, a wireless telecommunications network that provides a wireless telecommunications service and that are executable by the network functions virtualization platform;

generating, by the traffic congestion monitor, an aggregate traffic congestion indicator based upon the plurality of traffic congestion indicators, wherein the aggregate traffic congestion indicator is indicative of an aggregate network traffic congestion;

providing, by the traffic congestion monitor, the aggregate traffic congestion indicator to a traffic congestion analyzer of the traffic management system;

analyzing, by the traffic congestion analyzer, the aggregate traffic congestion indicator to determine a traffic management action to be taken to alleviate at least a portion of the aggregate network traffic congestion;

instructing, by the traffic congestion analyzer, a traffic congestion action responder to provide the traffic management action to be taken to alleviate at least the portion of the aggregate network traffic congestion; and instructing, by the traffic congestion action responder, at least a portion of the plurality of virtual network functions to perform the traffic management action.

18. The method of claim 17, further comprising receiving, by the traffic congestion analyzer, a policy from a policy system; and wherein analyzing, by the traffic congestion analyzer, the aggregate traffic congestion indicator to determine the traffic management action to be taken to alleviate at least the portion of the aggregate network traffic congestion experienced by the plurality of virtual network functions further comprises analyzing, in accordance with the policy, the aggregate traffic congestion indicator to determine the traffic management action to be taken to alleviate at least the portion of the aggregate network traffic congestion experienced by the plurality of virtual network functions.

19. The method of claim 18, further comprising:
receiving, by the traffic congestion analyzer, an event from an external event system; and
analyzing, by the traffic congestion analyzer, the event received from the external event system to determine the traffic management action to be taken to alleviate at least the portion of the network traffic congestion experienced by the plurality of virtual network functions.

20. The method of claim 17, wherein the traffic management action comprises increasing a traffic capacity of a virtual network function of the plurality of virtual network functions to support at least a portion of the aggregate network traffic congestion associated with the virtual network function of the plurality of virtual network functions at least in part by reducing a further traffic capacity of a further virtual network function of the plurality of virtual network functions and re-provisioning a reduced portion of the further traffic capacity of the further virtual network function to increase the traffic capacity of the virtual network function of the plurality of virtual network functions.

* * * * *